US010545841B2

(12) United States Patent
Xia et al.

(10) Patent No.: US 10,545,841 B2
(45) Date of Patent: Jan. 28, 2020

(54) METHOD AND APPARATUS FOR BACKUP COMMUNICATION

(71) Applicant: EMC IP HOLDING COMPANY LLC, Hopkinton, MA (US)

(72) Inventors: Qichao Xia, Beijing (CN); Wei Zheng, Shanghai (CN); Colin Yong Zou, Beijing (CN); Phoebe Ningning Cheng, Shanghai (CN); Man Lv, Beijing (CN); Mengwei Jiao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 290 days.

(21) Appl. No.: 15/388,034

(22) Filed: Dec. 22, 2016

(65) Prior Publication Data

US 2017/0192862 A1 Jul. 6, 2017

(30) Foreign Application Priority Data

Dec. 31, 2015 (CN) .......................... 2015 1 1030884

(51) Int. Cl.
*G06F 11/00* (2006.01)
*G06F 11/20* (2006.01)
*G06F 13/36* (2006.01)

(52) U.S. Cl.
CPC .......... *G06F 11/2007* (2013.01); *G06F 13/36* (2013.01); *G06F 2201/805* (2013.01)

(58) Field of Classification Search
CPC ............. G06F 11/3664; G06F 11/0766; G06F 11/2025; G06F 11/2033; G06F 11/2069; G06F 11/2092; H04L 43/10
See application file for complete search history.

(56) References Cited

U.S. PATENT DOCUMENTS 6,202,117 B1 * 3/2001 Gates .................... G06F 13/385
710/114
7,561,571 B1 * 7/2009 Lovett ..................... H04L 12/66
370/392

(Continued)

FOREIGN PATENT DOCUMENTS

CN 102244591 11/2011
CN 103092316 5/2013

OTHER PUBLICATIONS

Suresh Krishnan, et al.; "Remote Mirroring for Data Storage Systems Using Cloud Backup," U.S. Appl. No. 15/198,304, filed Jun. 30, 2016.

(Continued)

*Primary Examiner* — Bryce P Bonzo
*Assistant Examiner* — Jeison C Arcos
(74) *Attorney, Agent, or Firm* — BainwoodHuang (57) ABSTRACT

Embodiments of the present disclosure relate to a method and an apparatus for backup communication. The method comprises: detecting a failure of a management interface between a processor and a baseboard management controller; in response to detecting the failure of the management interface, performing backup communication between the processor and the baseboard management controller using a control interface, wherein the baseboard management controller can obtain a physical parameter of the processor via the control interface; and transmitting a packet between the processor and the baseboard management controller via the control interface.

17 Claims, 10 Drawing Sheets

(56) References Cited

U.S. PATENT DOCUMENTS

| | | |
|---|---|---|
| 9,967,337 B1 | 5/2018 | Tummala |
| 2002/0071386 A1* | 6/2002 | Gronke .................. H04L 45/00 370/217 |
| 2003/0135782 A1* | 7/2003 | Matsunami ......... G06F 11/0727 714/4.5 |
| 2004/0128201 A1* | 7/2004 | Ofir ....................... G06Q 20/04 705/17 |
| 2004/0207440 A1* | 10/2004 | Robertson ................. G06F 1/24 327/291 |
| 2006/0112297 A1* | 5/2006 | Davidson ............ G06F 11/1438 714/2 |
| 2006/0167919 A1* | 7/2006 | Hsieh .................. G06F 11/3664 |
| 2006/0259612 A1* | 11/2006 | De Oliveira ........ H04L 41/0226 709/224 |
| 2007/0038732 A1* | 2/2007 | Chandwani ............. H04L 41/24 709/223 |
| 2007/0097130 A1* | 5/2007 | Margulis ............... G06F 3/1431 345/501 |
| 2007/0124474 A1* | 5/2007 | Margulis .................. G06F 3/14 709/226 |
| 2007/0239872 A1* | 10/2007 | Lien .................... G06F 11/1612 709/224 |
| 2008/0010423 A1* | 1/2008 | Lien ....................... H04Q 11/04 711/162 |
| 2008/0244302 A1* | 10/2008 | Khatri ....................... G06F 1/14 713/502 |
| 2008/0263544 A1* | 10/2008 | Amano ................. G06F 9/5077 718/1 |
| 2009/0070639 A1* | 3/2009 | Langford ............ G06F 11/0709 714/57 |
| 2009/0100194 A1* | 4/2009 | Bhadri .................. G06F 13/105 709/244 |
| 2011/0016297 A1* | 1/2011 | Merizan ..................... G06F 8/65 713/1 |
| 2011/0029652 A1* | 2/2011 | Chhuor .............. G06F 9/45541 709/223 |
| 2011/0197193 A1* | 8/2011 | Miyabe .................. G06F 9/544 718/100 |
| 2012/0011402 A1* | 1/2012 | Chen .................. G06F 11/2284 714/25 |
| 2012/0254662 A1* | 10/2012 | Chen ...................... H04L 43/50 714/32 |
| 2014/0298091 A1* | 10/2014 | Carlen ................... H04L 65/80 714/15 |
| 2015/0106660 A1* | 4/2015 | Chumbalkar ....... G06F 11/0727 714/42 |
| 2016/0036628 A1* | 2/2016 | Gupta ..................... H04W 4/70 455/420 |
| 2019/0171362 A1 | 6/2019 | Dalmatov |

OTHER PUBLICATIONS

Nagashimha Haravu, et al.; "Cloud Data Archiving Using Chunk-Object Mapping and Synthetic Full Backup," U.S. Appl. No. 15/582,738, filed Apr. 30, 2017.

* cited by examiner

METHOD AND APPARATUS FOR BACKUP COMMUNICATION

RELATED APPLICATIONS

This application claim priority from Chinese Patent Application Number CN201511030884.6, filed on Dec. 31, 2015 at the State Intellectual Property Office, China, titled "BACKUP COMMUNICATION METHOD AND APPARATUS" the contents of which is herein incorporated by reference in its entirety.

FIELD

Embodiments of the present disclosure generally relate to communication technologies, and more specifically relate to a method and an apparatus for backup communication between a processor and a baseboard manager.

BACKGROUND

A baseboard management controller (BMC) usually communicates with a processor in a host device via a management interface (e.g., an intelligent platform management interface (IPMI)), wherein this IPMI is for example a keyboard control style (KCS), an $I^2C$-based intelligent platform management bus (IPMB), a Local Area Network (LAN)-based IPMB, a peripheral component interconnection (PCI), etc., among which the KCS interface enables the BMC to be directly connected with the processor, thereby the KCS interface is a most appropriate management interface. In the existing systems, the KCS interface between the BMC and the processor is generally carried out via a single low pin counter (LPC) bus.

Generally, a processor can communicate with a BMC via an IPMI to collect information about a temperature sensor and a system cooling state and so on. However, for the processor and the BMC, the existing IMPI specifications cannot detect the IPMI communication states of the system. For example, when both the processor and the BMC can work normally while the KCS interface fails, the IPMI specifications do not provide methods about how to detect and treat such failure.

In the existing systems, when an IPMI-based communication manner fails, the communication between the processor and the BMC is usually recovered by channel resetting or power re-starting. However, because the IPMI communication has been interrupted, it is possible that the processor cannot transmit a command for channel resetting or power re-starting to the BMC. In addition, in the existing systems, the BMC cannot request relevant services from the processor, and when the IPMI communication fails, the processor cannot obtain BMC-related log in time. Therefore, the existing approaches for power re-starting increase the downtime of the system and seriously affects the stability of the system and the user experience.

SUMMARY

In view of the above, embodiments of the present disclosure provide a method and an apparatus for backup communication between a processor and a baseboard manager.

According to one aspect of the present disclosure, there is provided a method for backup communication, comprising: detecting a failure of a management interface between a processor and a baseboard management controller, in response to detecting the failure of the management interface, performing backup communication between the processor and the baseboard management controller using a control interface, wherein the baseboard management controller can obtain a physical parameter of the processor via the control interface; and transmitting packets between the processor and the baseboard management controller via the control interface.

According to another aspect of the present disclosure, there is provided an apparatus for backup communication, comprising: a detecting unit configured to detect a failure of a management interface between a processor and a baseboard management controller; a responding unit configured to, in response to detecting the failure of the management interface, perform backup communication between the processor and the baseboard management controller using a control interface, wherein the baseboard management controller can obtain a physical parameter of the processor via the control interface; and a transmitting unit configured to transmit a packet between the processor and the baseboard management controller via the control interface.

According to yet another aspect of the present disclosure, there is provided an apparatus for backup communication, comprising: a store; a processor configured to detect a failure of a management interface between the processor and a baseboard management controller; in response to detecting the failure of the management interface, performing backup communication between the processor and the baseboard management controller using a control interface, wherein the baseboard management controller can obtain a physical parameter of the processor via the control interface; and transmitting a packet between the processor and the baseboard management controller via the control interface.

According to various embodiments of the present disclosure, at least one of the following technical effects may be achieved: when a management interface (e.g., IPMI) between the processor and the BMC fails, backup communication between the processor and the BMC is implemented using a control interface (e.g., PECI), which ensures bi-directional backup communication between the processor and the BMC, and enables the BMC to be self-recovered, meanwhile BMC log can also be obtained for subsequent analysis, which can reduce the downtime of the system and increase log analysis efficiency.

BRIEF DESCRIPTION OF DRAWINGS

The features, advantages and other aspects of various embodiments of the present disclosure will become more apparent with reference to the detailed description below in conjunction with the accompanying drawings. Here, a number of embodiments of the present disclosure are shown in exemplary rather than limited way. In the accompanying drawings.

DETAILED DESCRIPTIONS

Hereinafter, various exemplary embodiments of the present disclosure will be described in detail with reference to the accompanying drawings. The flow diagrams and block diagrams in the accompanying drawings illustrate hierarchical architectures, functions, and operations possibly implemented for the method and system according to various embodiments of the present disclosure. It should be noted that each block in the flow diagrams or block diagrams may represent part of a module, a program segment, or code, the part of module, program segment or code may include one or more executable instructions for implementing logic functions prescribed in various embodiments. It should also be noted that in some alternative implementations, functions annotated within the blocks may also occur in an order different from that annotated in the drawings. For example, two successively represented blocks may be executed substantially in parallel in practice, or sometimes they may be executed in a reverse order, depending on the functions involved. Likewise, it should be noted that each block in the flow diagrams and/or block diagrams, and a combination of blocks in the flow diagrams and/or block diagrams may be implemented using an exclusive hardware-based system that performs the prescribed functions or operations, or may be implemented using a combination of exclusive hardware with computer instructions.

The terms "comprise," "include" or similar terms used herein should be understood as open terms, namely, "comprising/including, but not limited to." The term "based" means "at least partially based." The term "one embodiment" indicates "at least one embodiment"; the term "another embodiment" or "a yet another embodiment" indicates "at least one another embodiment." Relevant definitions of other terms will be provided in the depiction below.

Figure 1:
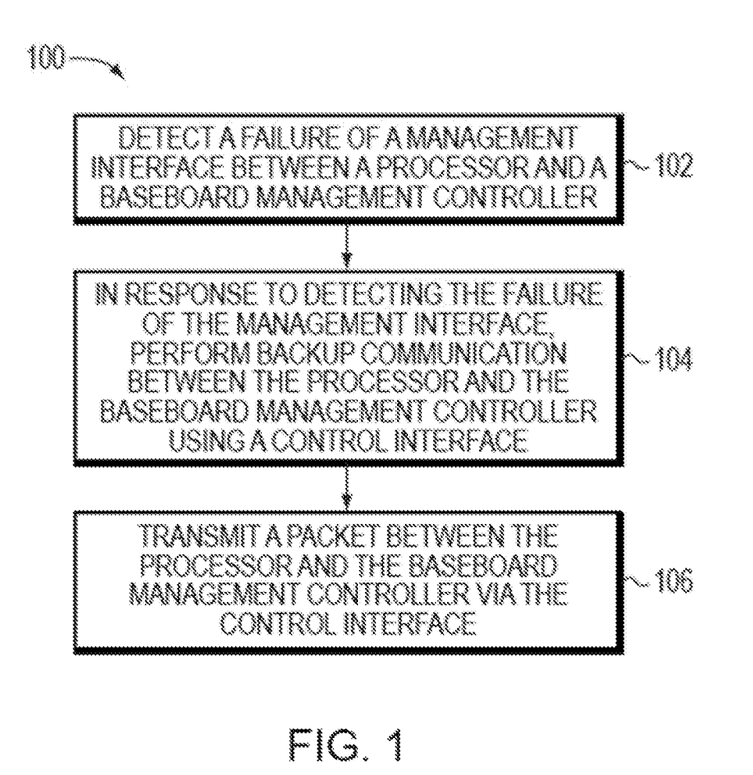
FIG. 1 illustrates a flow chart of a method for backup communication 100 according to the embodiments of the present disclosure.

FIG. 1 illustrates a flow diagram of a method for backup communication 100 according to the embodiments of the present disclosure. At block 102, whether a management interface between a processor and a baseboard management controller (BMC) fails is detected. Optionally, the management interface may be an intelligent platform management interface (IPMI), which is an industrial standard for managing peripheral devices used in various systems. The IPMI, which is a hardware management interface specification of an open standard, can independently detect a state of hardware connected thereto, e.g., it may be used to monitor physical health features of the server, e.g., temperature, voltage, power supply state, and the like. Under normal communication conditions, the processor and the BMC communicate with each other via the IPMI.

In one embodiment, detecting a failure of a management interface between a processor and a baseboard management controller comprises: determining whether a length of a time interval of communication of the management interface between the processor and the baseboard management controller exceeds a threshold length. That is to say, if the time interval of communication of the IPMI between the processor and the BMC is too long, it indicates that a fault likely occurs to the IPMI communication. Therefore, based on the threshold length, whether the IPMI communication fails may be determined, optionally, the threshold length may be set to 50 milliseconds.

The method 100 proceeds to block 104. In response to detecting the failure of the management interface, backup communication between the processor and the baseboard management controller is performed using the control interface, wherein the baseboard management controller can obtain a physical parameter of processor (e.g., temperature of the processor) via the control interface. Optionally, the control interface may be a platform environment control interface (PECI). Platform environment control interface (PECI), which is a standard bus interface proposed by Intel Corp., is an exclusive single-line bus existing between a processor and other chips or a system stability monitoring device (e.g., BMC). The PECI defaults that registers are dumped by other chips or systems (e.g., BMC) when an internal error occurs to the processor, such registers include a PCI configuration register. Because it is stable enough, it may be used as a backup communication interface. Some PCI configuration registers are retained by the processor and will not be used by firmware and the operation system, the processor itself may always access these registers via a PCI configuration access, therefore, as long as the PECI connection is implemented between the processor and the BMC, the BMC may also read and access these registers via the PECI bus. Therefore, when the IPMI between the processor and the BMC fails, the PECI may be used to implement the backup communication between the processor and the BMC. That is to say, when the IPMI communication fails, the PECI interface will be used to ensure backup communication between the processor and the BMC.

In one embodiment, the backup communication is a bi-directional communication, and a packet in the backup communication includes communication type code, function code, and response code, wherein the communication type code indicates the type of the backup communication, the function code indicates a function to be launched, and the response code indicates a response state of the backup communication. To design a uniform communication packet format, the communication packet in the backup communication at least includes communication type code, function code, and response code. Alternatively, the communication packet also includes a reserved bit. For example, the PECI-based communication packet between the processor and the BMC may comprise 32 bits, wherein the type code, function code, response code and reserved bit include 8 bits, respectively, as shown in the table below.

| Type code | Function code | Response code | Reserved code |
| --- | --- | --- | --- |

In one embodiment, backup communication types comprise, for example, the four as follows: transmitting a request to the BMC, receiving a response from the BMC, receiving a request from the BMC, and responding to a request received from the BMC. For example, the four backup communication types above are represented using two bits (e.g., the 24th and 25th bits in the packet).

| Direction | Request/response | 24$^{th}$ bit | 25$^{th}$ bit |
|---|---|---|---|
| BMC-to-Processor | request | 0 | 0 |
| BMC-to-Processor | response | 0 | 1 |
| Processor-to-BMC | request | 1 | 0 |
| Processor-to-BMC | response | 1 | 1 |

During the backup communication, the processor and the BMC provide some functions to be launched, wherein the function code indicates a function to be launched. The functions to be launched includes, but not limited to: triggering a self-recovery of the BMC, retrying the IPMI-based communication, requesting a service of the processor, and obtaining a log of the BMC. Upper-layer services may be implemented and identified according to the function code, and because the PECI specification has implemented a frame check sequence, error detection and recovery are not needed in a format of the packet. For example, in the following table, main function code is represented by 4 bits, while sub-function code is represented by another 4 bits.

| Function to start | Main function code (20$^{th}$-23$^{rd}$ bits) | Sub-function code (16$^{th}$-19$^{th}$ bits) |
|---|---|---|
| Self-recover the BMC | 0000 | Varying with recovery methods |
| Retry the IMPI command | 0001 | Varying with components of the BMC |
| Request for a service of the processor | 0010 | Vary with service types |
| Obtain the service of the BMC | 0011 | Varying with log files of the BMC |

In one embodiment, in block 104, in response to detecting the failure of the management interface, performing backup communication between the processor and the baseboard management controller using a control interface comprises: when failure occurs to the management interface, transmitting, by the processor, a failure message to a message store, and detecting, by a baseboard management controller, whether a failure message exists in the message store. For example, the message store may be a mailbox. For example, two mailboxes may be arranged specifically for the processor and the BMC to write into, respectively.

The method 100 proceeds to block 106, transmitting a packet between the processor and the baseboard management controller via the control interface. In one embodiment, a self-recovery request may be transmitted from the processor to the baseboard management controller via the control interface so as to trigger a self-recovery of the baseboard management controller. In another embodiment, a communication channel that is based on management interface may be reset. Optionally, as long as the PECI-based backup communication is created between the processor and the BMC, the processor will transmit a self-recovery request to the BMC so as to trigger the self-recovery of the BMC. Optionally, in order to ensure that the IPMI channel and the communication are indeed recovered, the BMC may request the processor to retry and check whether the IPMI has resumed working.

In one embodiment, in block 106, before transmitting the self-recovery request from the processor to the baseboard management controller via the control interface, the processor may obtain a log of the baseboard management controller from the baseboard management controller via the control interface. In another embodiment, in block 106, after transmitting the self-recovery request from the processor to the baseboard management controller via the control interface, a retry request may be transmitted from the baseboard management controller to the processor via the control interface so as to retry the communication that is based on management interface.

From the perspective of the processor, once the processor detects that any IPMI command is overtime, the processor will firstly check an IPMI drive. If the IPMI drive is normal, perform blocks 102, 104, and 106 in method 100. From the perspective of BMC, once the BMC receives a check request, the BMC firstly checks IPMI application. If a problem is found, reset the IPMI application. Generally, most (e.g., 75%) of communication failures may be recovered through resetting. If the failure still exists, the processor will re-transmit other types of check request. For example, the table below lists the function code corresponding to several check requests.

| Function to be launched | Main function code (20$^{th}$-23$^{rd}$ bit) | Sub-function code (16$^{th}$-19$^{th}$ bit) |
|---|---|---|
| IPIM application Checking | 0000 | 0000 |
| BMC hot resetting | 0000 | 0001 |
| BMC cold resetting | 0000 | 0010 |
| Delayed closure | 0000 | 0011 |

On the contrary, in the existing system, although BMC may be compulsorily cold reset, the BMC cannot request for a service of the processor, so the processor cannot know when the BMC completes cold resetting. Therefore, the processor can only wait for a limited time to retransmit the IPMI command, wherein the limited time can only rely on the experience of the persons skilled and vary with different system platforms.

In one embodiment, the BMC may request a service of the processor. During self-recovery of the BMC, besides a retry request, the BMC may also request other type of service from the processor, e.g., requesting the processor to provide system information, or requesting the processor to dump its PCI registers and memories. For example, function code corresponding to several requested services of the processor are listed in the table below. In addition, the functions in the table below may be extended as needed.

| Request type | Main function code (20$^{th}$-23$^{rd}$ bit) | Sub-function code (16$^{th}$-19$^{th}$ bit) |
|---|---|---|
| Retry IPMI command | 0010 | 0000 |
| Obtain an OS state of the processor | 0010 | 0001 |
| Obtain CPU information of the processor | 0010 | 0010 |
| Obtain memory information of the processor | 0010 | 0010 |
| Obtain all PCI devices | 0010 | 0100 |

In one embodiment, when the IPMI communication fails, the processor may obtain BMC-related log using a PECI interface supporting bi-directional backup communication. In order to analyze other files, the main function code and the sub-function code may be used for indicating a file that needs to be extracted.

| Request type | Main function code ($20^{th}$-$23^{rd}$ bit) | Sub-function code ($16^{th}$-$19^{th}$ bit) |
| --- | --- | --- |
| Obtain kernel log of the BMC | 0100 | 0000 |
| Obtain IPMI log of the BMC | 0100 | 0001 |
| Obtain all log required | 0100 | 0010 |

Finally, the method 100 may also comprise: when the failure has been repaired, resuming the communication based on the management interface between the processor and the baseboard management controller. That is to say, after the IPMI communication failure has been recovered, the communication between the processor and the BMC may be resumed using the IPMI, while the PECI is only used for backup communication during occurrence of failure between the processor and the BMC.

Figure 2:
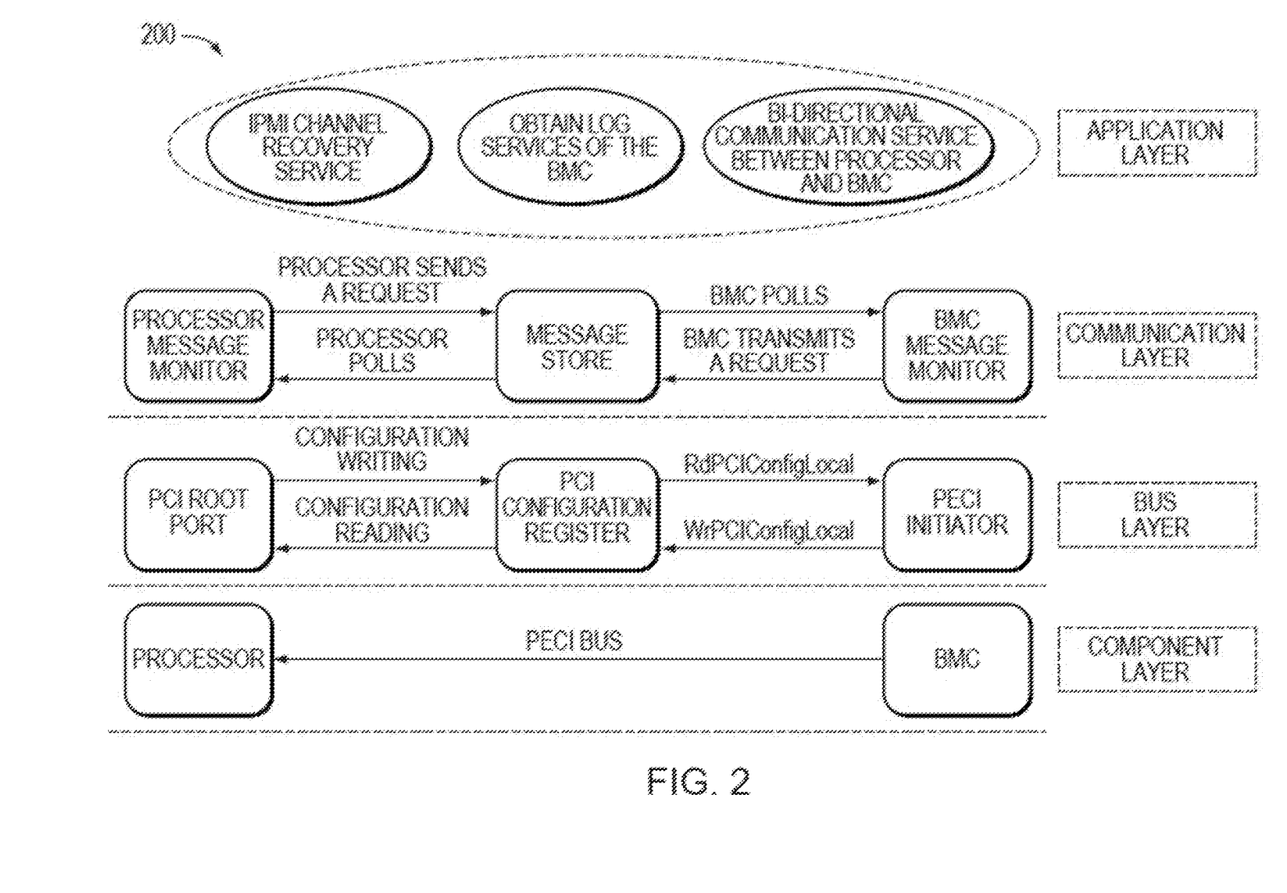
FIG. 2 illustrates a backup communication hierarchical diagram 200 according to the embodiments of the present disclosure.

FIG. 2 illustrates a backup communication hierarchical diagram 200 according to the embodiments of the present disclosure. As illustrated in FIG. 2, it is divided into an application layer, a communication layer, a bus layer, and a component layer. At the application layer, IPMI channel recovery service, the service of obtaining BMC log, and the bi-directional communication service between the processor and the BMC may be implemented; at the communication layer, real-time monitoring of the failure message is implemented by setting a message store; at the bus layer, backup communication drive is implemented via PCI configuration registers; at the component layer, communication between the processor and the BMC is implemented via the PECI bus.

In one embodiment, a message store is arranged between the processor and the BMC. Without affecting other operations of the system, any register that can be read and written by the processor and the BMC may be selected as a message store. According to the values in the message store, the processor and the BMC may determine an action type that should be adopted.

In some embodiments, a principle of selecting a message store may be selected. For example, in the BMC and the processor, there are many registers that may be accessed by the PECI, therefore, the reserved registers which have not been used by hardware may not only be accessed by the processor, but also may be accessed by a BMC that is connected to the processor via the PECI bus. Therefore, these registers may be selected as a message store or mailbox between the processor and the BMC. The processor may write any message into the message store, and the BMC may perform a predefined task according to the message in the message store; meanwhile, the BMC may also write any message into the message store, and the processor may also perform a predetermined task according to the message in the message store.

Figure 3:
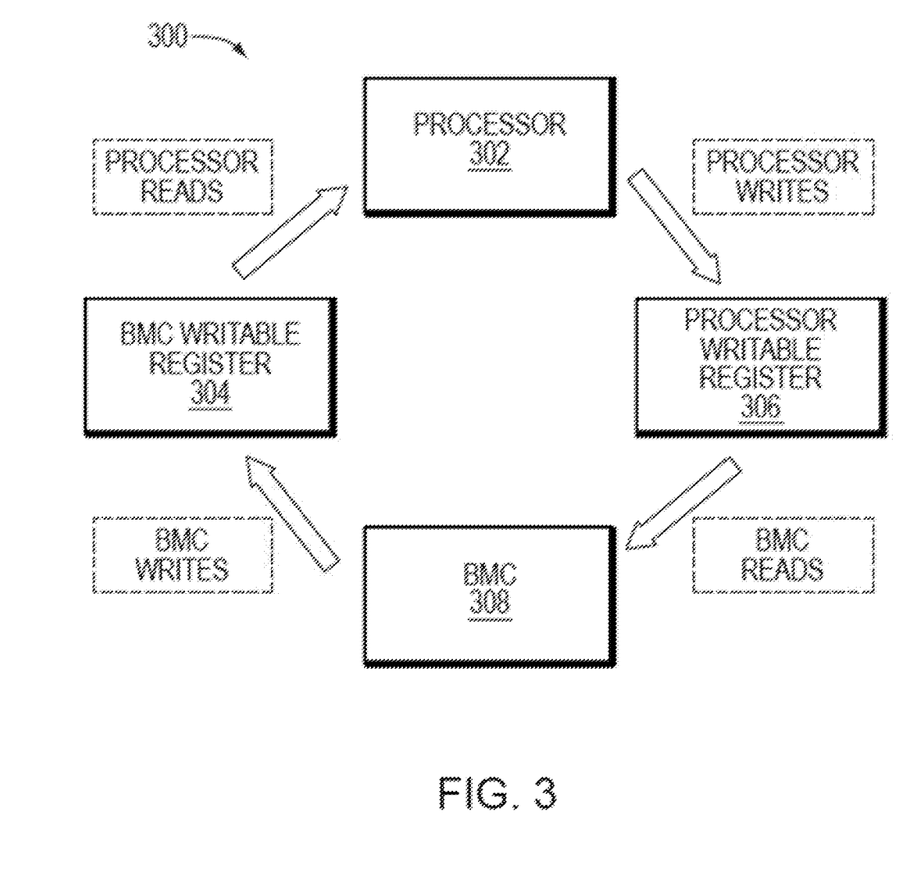
FIG. 3 illustrates a schematic diagram 300 of using two registers as a message store according to the embodiments of the present disclosure.

FIG. 3 illustrates a schematic diagram of using two registers as a message store according to the embodiments of the present disclosure. In order to prevent the processor and the BMC from writing into the same register, two registers may be used to create a respective communication link. As illustrated in FIG. 3, the register 304 may be only written by the BMC 308, while the register 306 may be only written by the processor 302.

Figure 4:
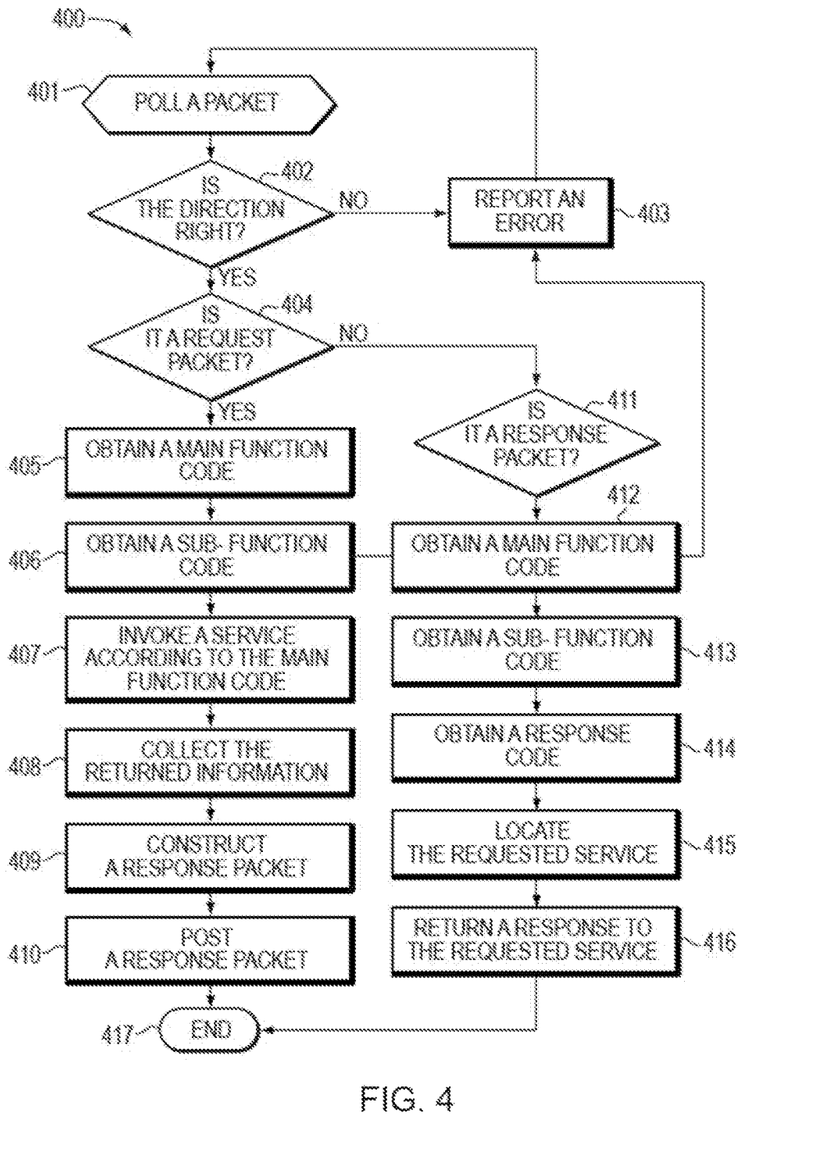
FIG. 4 illustrates a backup communication flow chart 400 between a processor and a BMC according to the embodiments of the present disclosure.

FIG. 4 illustrates a flow diagram 400 of a backup communication between a processor and a BMC according to the embodiments of the present disclosure, wherein in block 401, the processor polls a packet on a PECI bus; in block 402, whether a communication direction is correct is determined, and if the communication direction is incorrect, error is reported in block 403; if the communication direction is correct, whether the packet is a request packet is determined in block 404. If yes in block 404, perform blocks 405-410 which are: obtaining main function code and sub-function code in the packet, invoking service according to the function code, collecting the returned information, and constructing a response packet, and posting the response packet; if no in block 404, perform block 411 to further determine whether the packet is a response packet. If no in block 411, report an error; if yes in block 411, perform blocks 412-416 which are: obtaining main function code and sub-function code, obtaining a response code, locating the requested service and returning a response to the requested service. In some embodiments, the method may terminate at block 417.

Figure 5:
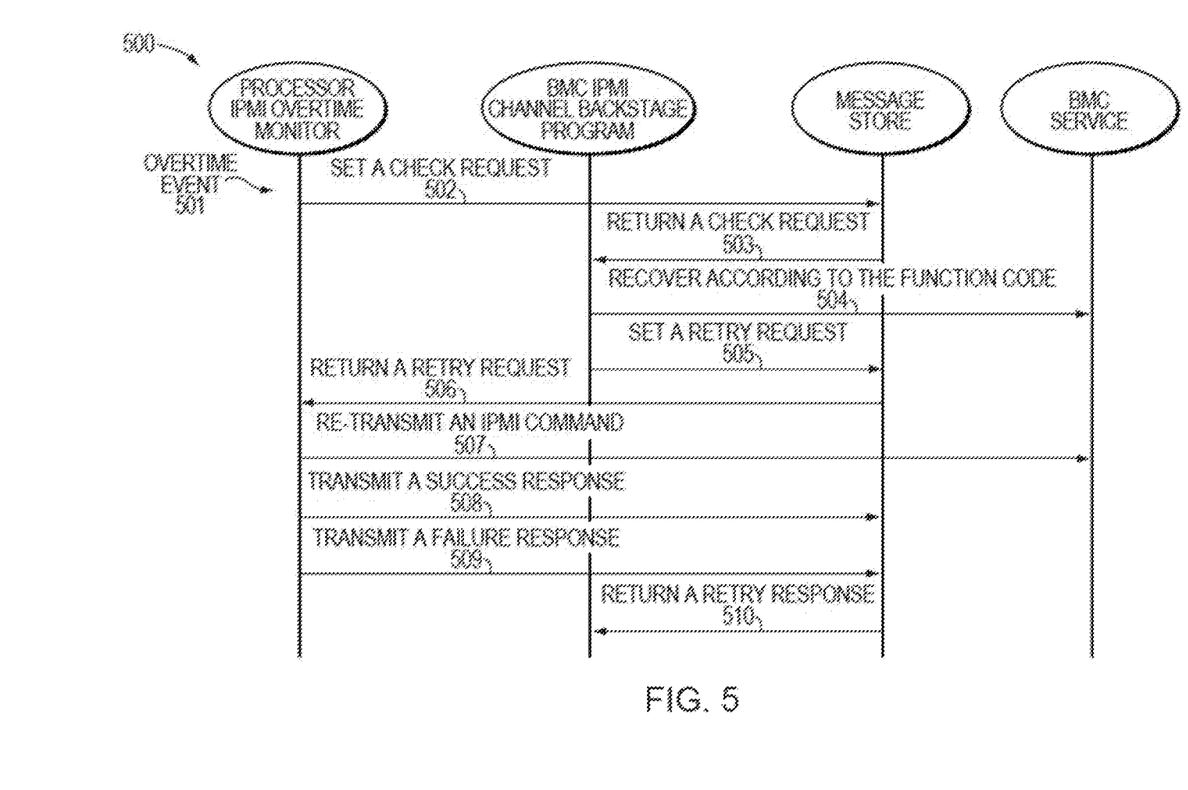
FIG. 5 illustrates a communication flow chart 500 of monitoring a failure message using a message store according to the embodiments of the present disclosure.

FIG. 5 illustrates a communication flow diagram 500 of monitoring a failure message using a message store according to the embodiments of the present disclosure, in order to promptly check abnormality of the BMC, an IPMI overtime monitor is run on the processor to detect whether failure occurs to the IMPI communication; in order to timely respond to a recovery request from the processor, a BMC IPMI channel backstage program is for detecting whether a failure occurs. Particularly, in block 501, the processor IPMI overtime monitor receives an overtime event; in response to the overtime event, in block 502, a check request is set to the message store; and in block 503, a check request is returned to the BMC IPMI channel backstage program. Then in blocks 504 and 505, the BMC IPMI channel backstage program is resumed based on function code, and a retry request is set to the message store. In block 506, the message store returns a retry request to the processor IPMI overtime monitor such that in block 507, the processor IPMI overtime monitor retransmits an IPMI command. Then, the processor IPMI overtime monitor transmits a success response (block 508) or a failure response (block 509) to the message store. Finally, in block 510, the message store may return a retry response to the BMC IPMI channel backstage program.

Figure 6:
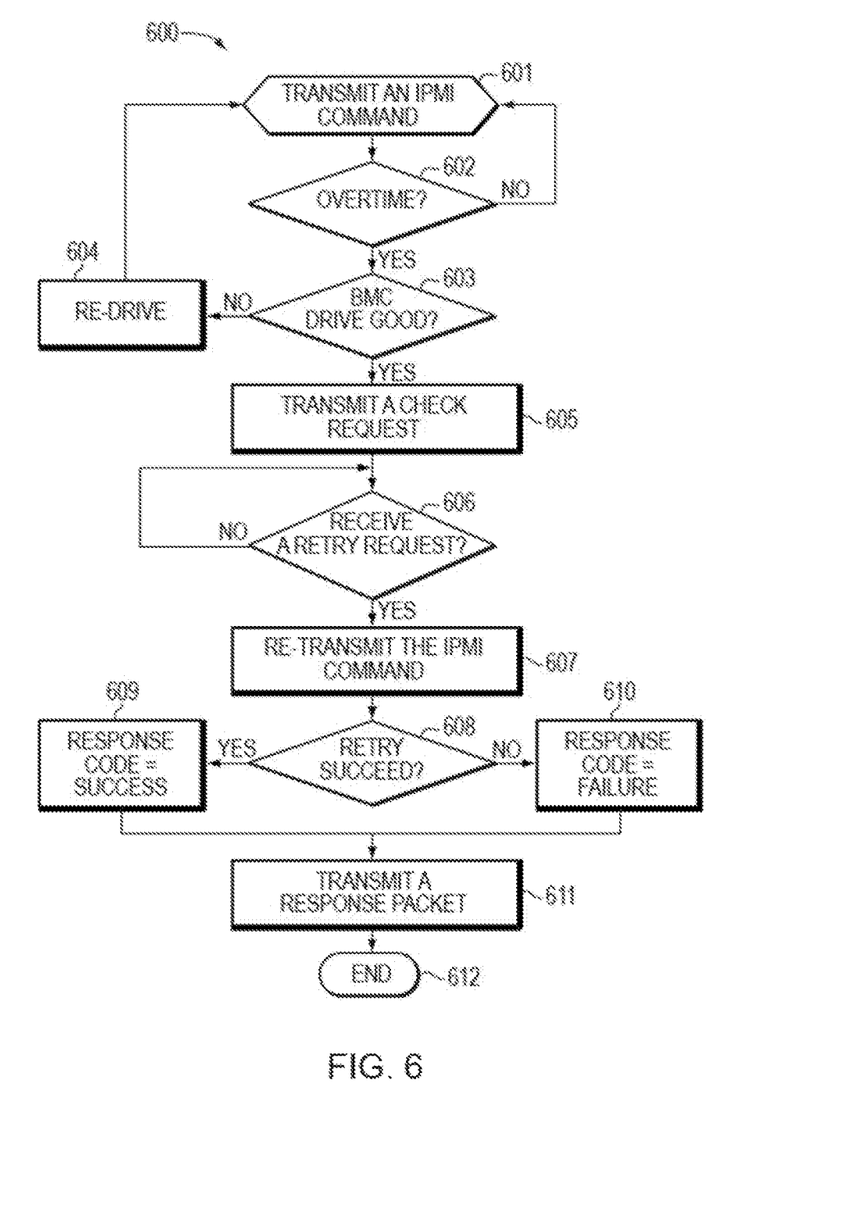
FIG. 6 illustrates a flow chart 600 of retrying an IPMI command according to the embodiments of the present disclosure.

FIG. 6 illustrates a flow diagram 600 of retrying an IPMI command according to the embodiments of the present disclosure. Particularly, in block 601, the processor transmits an IPMI command; if the IPMI is overtime (block 602), the method proceeds to block 603 to detect whether a BMC drive is good; if the BMC drive is not good, the drive is re-loaded in block 604; if the BMC drive is good, in block 605, a check request is transmitted to the BMC. Then, in block 606, if a retry request is received, the IPMI command is re-transmitted; and in block 608, whether the retry is successful is detected, and a respective successful respond code or failure response code is generated according to a result of detecting in block 608; in addition, in block 611, a response packet is transmitted to the BMC. In some embodiments, the method may terminate at block 612.

Figure 7:
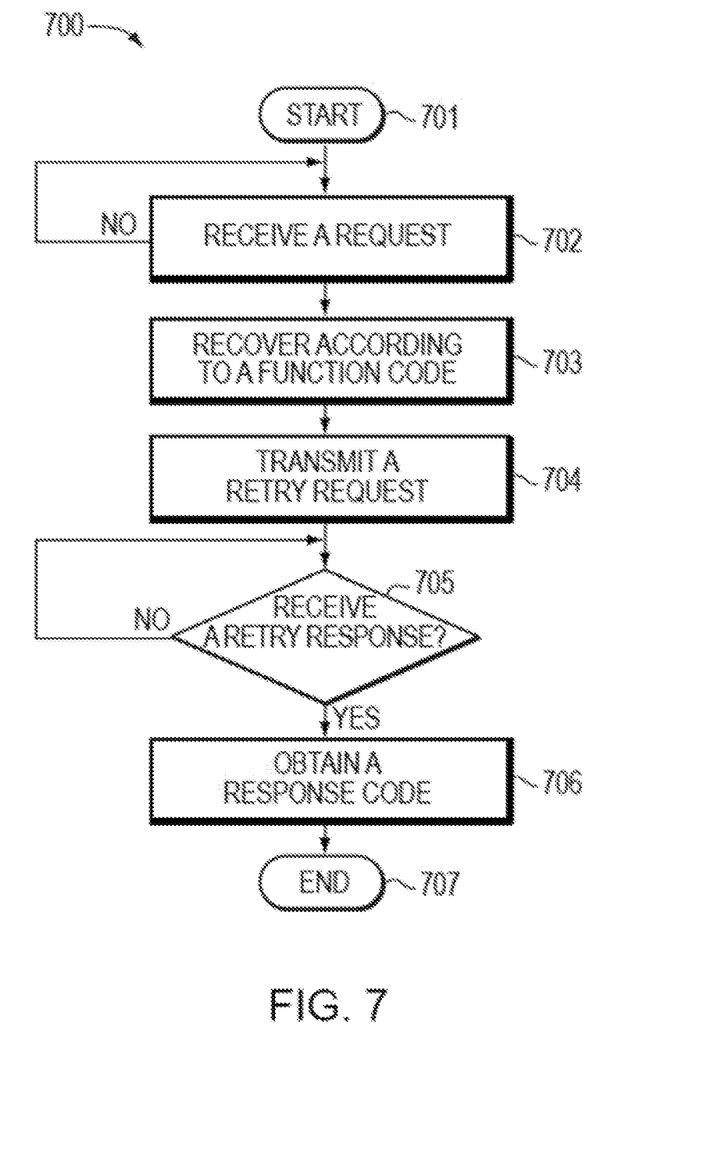
FIG. 7 illustrates a work flow chart 700 of an IPMI passage backstage program of BMC according to the embodiments of the present disclosure.

FIG. 7 illustrates a work flow diagram 700 of an IPMI passage backstage program of BMC according to the embodiments of the present disclosure. In some embodiments, the method 700 starts at block 701, and in block 702, the IPMI channel backstage program of the BMC determines whether the request is received. Particularly, if the request is received in block 702, in block 703, recovery is performed according to a corresponding function code, and in block 704, a retry request is transmitted. In block 705, whether a retry response is received is determined. If the retry response is received in block 705, a response code is obtained in block 706. In some embodiments, the method may terminate at block 707.

Figure 8:
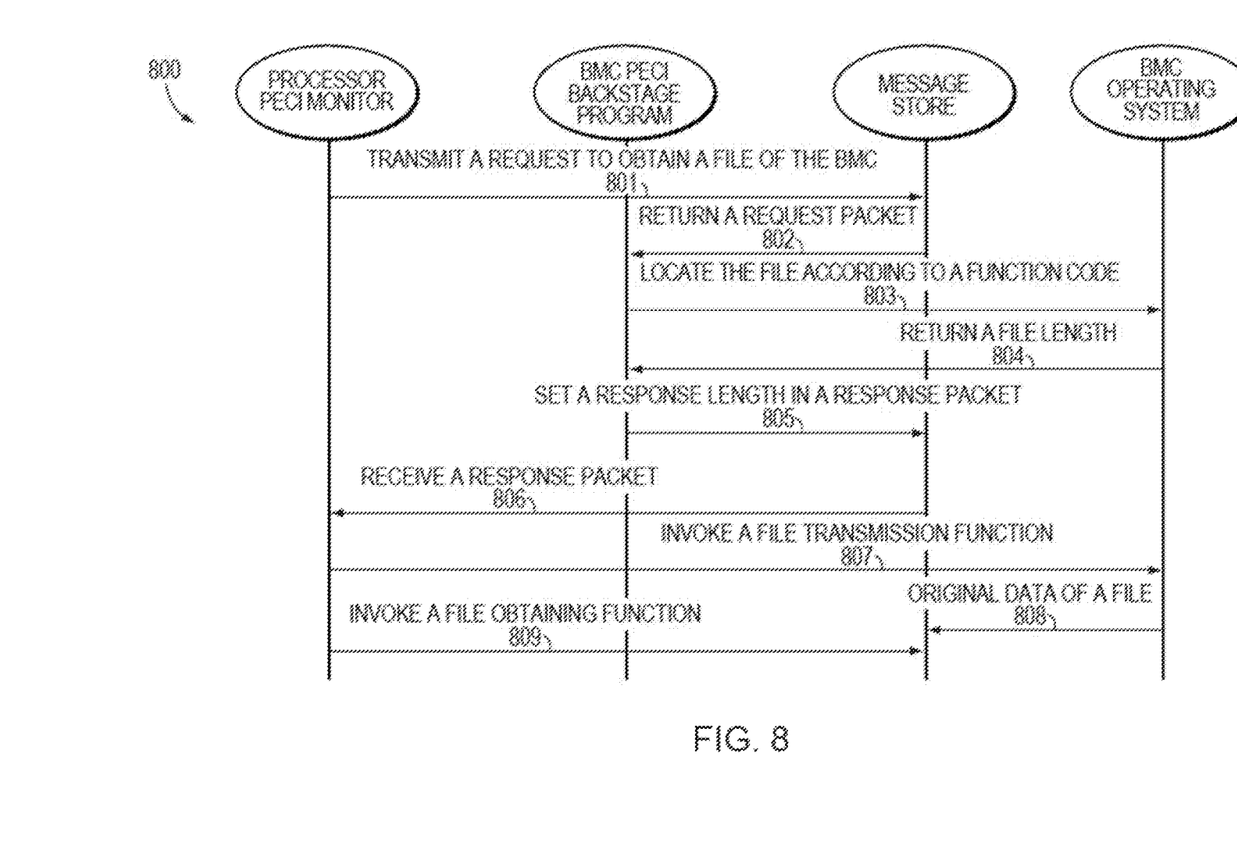
FIG. 8 illustrates a flow chart 800 of obtaining a BMC file according to the embodiments of the present disclosure.

FIG. 8 illustrates a flow diagram 800 of obtaining a BMC file according to the embodiments of the present disclosure. When the processor has detected that a failure occurs to the IPMI, before transmitting a self-recovery request from the processor to the BMC, the processor obtains a file (e.g., a log) of the BMC from the BMC. When a backstage program running on the BMC detected a failure message in the message store, the BMC responds to a corresponding request transmitted by the processor.

On the contrary, in the existing system, the processor cannot obtain the log of the BMC in time; therefore, it is needed to logon to debug using a specific console or via a SSH. However, the console manner needs certain hardware support, and it is also very complex to create a console connection; the SSH manner needs a support to the SSH, however, in much hardware, the SSH port has been disabled.

In method 800, at block 801, a processor PECI monitor transmits a request to a message store to obtain a BMC file; at block 802, the message store returns the packet requested to a BMC PECI backstage program; at block 803, the BMC PECI backstage program locates a file according to a function code; and at block 804, a BMC operating system returns a file length to the BMC PECI backstage program; correspondingly, at block 805, the BMC PECI backstage program sets a response length in a response packet; and at block 806, the processor PECI monitor receives a response packet. Then, at block 807, the BMC PECI backstage program invokes a file transmitting function from the BMC operating system; at block 808, the BMC operating system returns original data of the file to the message store. Finally, at block 809, the processor PECI monitor invokes a file obtaining function so as to obtain a desired BMC file from the message store.

Figure 9:
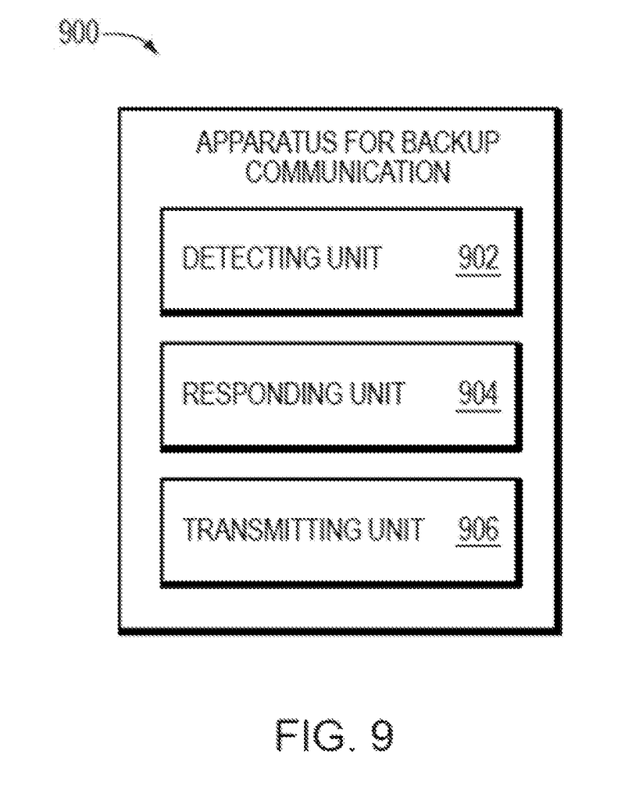
FIG. 9 illustrates a block diagram of an apparatus for backup communication 900 according to the embodiments of the present disclosure.

FIG. 9 illustrates a block diagram of an apparatus for backup communication 900 according to the embodiments of the present disclosure. The apparatus 900 comprises a detecting unit 902 configured to detect a failure of a management interface between a processor and a baseboard management controller; a responding unit 904 configured to, in response to detecting the failure of the management interface, perform backup communication between the processor and the baseboard management controller using a control interface, wherein the baseboard management controller can obtain a physical parameter of the processor through the control interface; and a transmitting unit 906 configured to transmit a packet between the processor and the baseboard management controller via the control interface. In one embodiment, the management interface is an intelligent platform management interface (IPMI) and/or the control interface is a platform environment control interface (PECI).

In one embodiment, the detecting unit 902 is further configured to: determine whether a length of a time interval of communication of the management interface between the processor and the baseboard management controller exceeds a threshold length.

In one embodiment, the backup communication may be a bi-directional communication, and the packet in the backup communication includes communication type code, function code, and response code, wherein the communication type code indicates the type of the backup communication, the function code indicates a function to be launched, and the response code indicates a response state of the backup communication. In another embodiment, the type of the backup communication may include at least one of: transmitting a request to the BMC, receiving a request from the BMC, receiving a request from the BMC, and responding to a request received from the BMC. In yet another embodiment, the function to be launched may include at least one of: triggering a self-recovery of the baseboard management controller, retrying the communication based on the management interface, requesting a service of the processor, and obtaining a log of the baseboard management controller.

In one embodiment, the response module 904 is further configured to: when failure occurs to the management interface, transmit, by the processor, a failure message to a message store, and detect, by a baseboard management controller, whether a failure message exists in the message store. In another embodiment, the transmitting unit 906 is further configured to: transmit a self-recovery request from the processor to the baseboard management controller via the control interface so as to trigger a self-recovery of the baseboard management controller. In yet another embodiment, the transmitting unit 906 is further configured to: reset the communication channel that is based on the management interface.

In one embodiment, the transmitting unit 906 is further configured to: before transmitting the self-recovery request from the processor to the baseboard management controller via the control interface, obtain, by the processor, the log of the baseboard management controller from the baseboard management controller via the control interface. In another embodiment, the transmitting unit 906 is further configured to: after transmitting the recovery request from the processor to the baseboard management controller via the control interface, receive, by the processor, a retry request from the baseboard management controller via the control interface so as to retry the communication based on the management interface.

In one embodiment, the apparatus 900 further comprises a recovery unit (not shown) which, when the failure has been repaired, may recover communication, based on the management interface, between the processor and the baseboard management controller.

Figure 10:
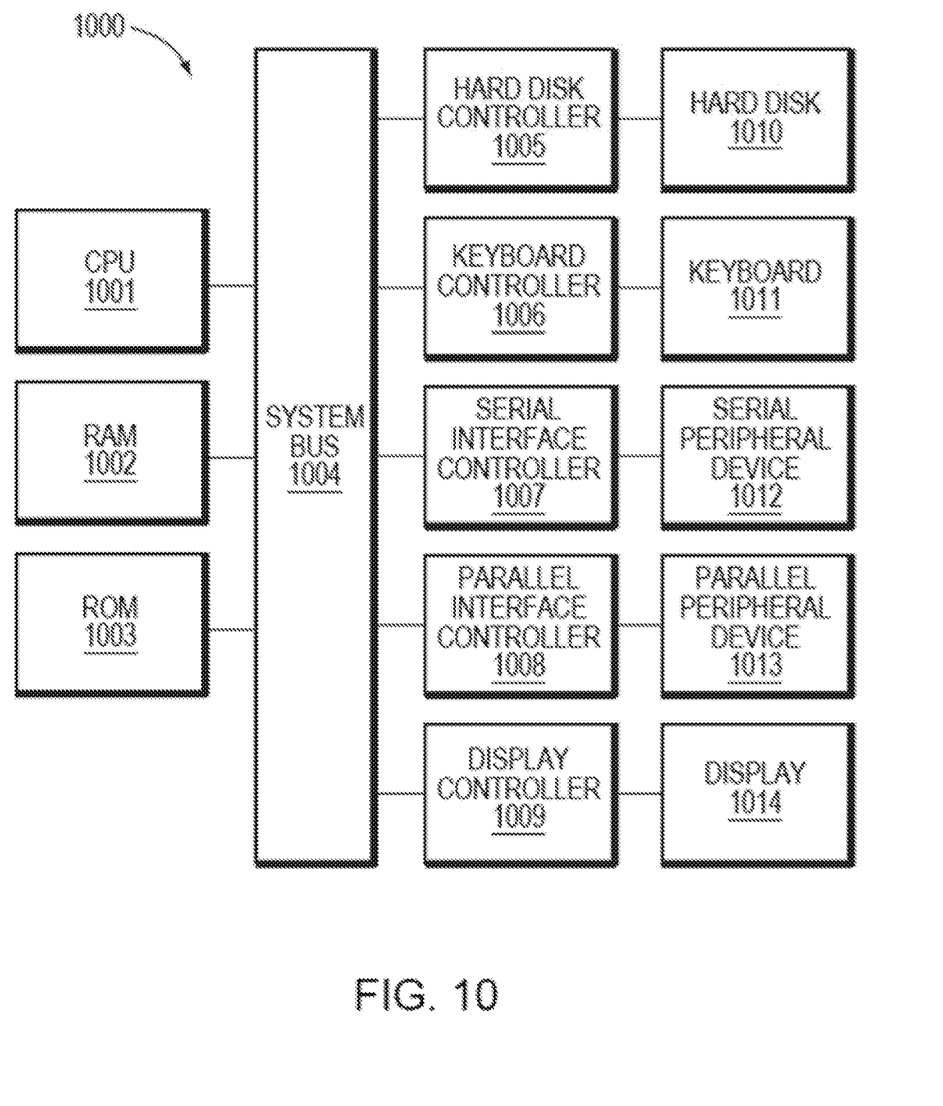
FIG. 10 illustrates a block diagram of a computer device 1000 in which a simulating method according to the present disclosure may be implemented.

Hereinafter, FIG. 10 will be referenced to describe a computer device in which a method for backup communication of the present disclosure may be implemented. FIG. 10 illustrates a block diagram of a computer device 1000 in which the method for backup communication according to the present disclosure may be implemented.

The computer system as illustrated in FIG. 10 comprises a CPU (central processing unit) 1001, a RAM (random access memory) 1002, a ROM (read-only memory) 1003, a system bus 1004, a hard-disk controller 1005, a keyboard controller 1006, a serial interface controller 1007, a parallel interface controller 1008, a display controller 1009, a hard disk 1010, a keyboard 1011, a serial peripheral device 1012, a parallel external device 1013, and a display 1014. Among these components, those connected to the system bus 1004 are the CPU 1001, the RAM 1002, the ROM 1003, the hard disk controller 1005, the keyboard controller 1006, the serial interface controller 1007, the parallel interface controller 1008, and the display controller 1009. The hard disk 1010 is connected to the hard disk controller 1005, the keyboard 1011 is connected to the keyboard controller 1006, the serial external device 1012 is connected to the serial interface controller 1007, the parallel external device 1013 is connected to the parallel interface controller 1008, and the display 1014 is connected to the display controller 1009. It should be noted that the structural block diagram as illustrated in FIG. 10 is only illustrated for exemplary purposes, not for limiting the present disclosure. In some cases, some devices may be added or reduced according to the needs. The implements of the present disclosure may be stored as computer program code in a storage device (e.g., the hard disk 1010) on the computer, which, when being loaded into, for example, the memory to run, will make the CPU 1001 to execute the backup communication method according to the embodiments of the present disclosure.

What have been described above are only the optional embodiments of the present disclosure, which do not limit the embodiments of the present disclosure. To those skilled in the art, the embodiments of the present disclosure may have various modifications and variations. Any modifications, equivalent substitutions and improvements within the spirit and principle of the embodiments of the present disclosure should be included within the protection scope of the embodiments of the present disclosure.

What is claimed is:

1. A method for backup communication, comprising:
   detecting a failure of a management interface between a processor and a baseboard management controller (BMC);
   in response to detecting the failure of the management interface, performing backup communication between the processor and the BMC using a control interface, the BMC being able to obtain a physical parameter of the processor via the control interface; and
   transmitting a packet between the processor and the BMC via the control interface,
   wherein the detecting a failure of a management interface between a processor and a baseboard management controller comprises:
   determining whether a length of a time interval of communication of the management interface between the processor and the BMC exceeds a threshold length,
   wherein the backup communication is bi-directional communication, the packet in the backup communication includes a communication type code, a function code and a response code, and the communication type code indicates a type of the backup communication, the function code indicates a function to be launched, and the response code indicates a response state of the backup communication.

2. The method according to claim 1, wherein
   the management interface is an intelligent platform management interface (IPMI), or
   the control interface is a platform environment control interface (PECI).

3. The method according to claim 1, wherein the type of the backup communication includes at least one of: transmitting a request to the BMC; receiving a response from the BMC; receiving a request from the BMC; and responding to a request received from the BMC.

4. The method according to claim 1, wherein the function to be launched includes at least one of: triggering a self-recovery of the BMC, retrying communication based on the management interface, requesting a service of the processor, and obtaining a log of the BMC.

5. The method according to claim 1, wherein the performing backup communication between the processor and the BMC using a control interface comprises:
   in response to detecting the failure of the management interface, transmitting a failure message to a message store, and
   enabling the BMC to detect whether the failure message exists in the message store.

6. The method according to claim 1, wherein the transmitting a packet between the processor and the BMC via the control interface comprises:
   transmitting a self-recovery request from the processor to the BMC via the control interface so as to trigger a self-recovery of the BMC.

7. The method according to claim 6, wherein the triggering a self-recovery of the BMC comprises:
   resetting a communication channel that is based on the management interface.

8. The method according to claim 6, wherein the transmitting a packet between the processor and the BMC via the control interface further comprises:
   before transmitting the self-recovery request from the processor to the BMC via the control interface, obtaining a log of the BMC from the BMC via the control interface.

9. The method according to claim 6, wherein the transmitting a packet between the processor and the BMC via the control interface further comprises:
   after transmitting the self-recovery request from the processor to the BMC via the control interface, receiving a retry request from the BMC via the control interface so as to retry the communication channel that is based on the management interface.

10. The method according to claim 9, further comprising:
    in response to the failure being repaired, recovering the communication channel that is based on the management interface between the processor and the BMC.

11. An apparatus for backup communication, comprising a controller constructed and arranged to:
    detect a failure of a management interface between a processor and a baseboard management controller (BMC);
    determine whether a length of a time interval of communication of the management interface between the processor and the BMC exceeds a threshold length;
    in response to detecting the failure of the management interface, perform backup communication between the processor and the BMC using a control interface, the backup communication being a bi-directional communication, and the BMC being able to obtain a physical parameter of the processor via the control interface; and
    transmit a packet between the processor and the BMC via the control interface, the packet in the backup communication includes a communication type code, a function code and a response code, and the communication type code indicates a type of the backup communication, the function code indicates a function to be launched, and the response code indicates a response state of the backup communication.

12. The apparatus according to claim 11, wherein
    the management interface is an intelligent platform management interface (IPMI), or
    the control interface is a platform environment control interface (PECI).

13. The apparatus according to claim 11, wherein the type of the backup communication includes at least one of: transmitting a request to the BMC; receiving a response from the BMC; receiving a request from the BMC; and responding to a request received from the BMC.

14. The apparatus according to claim 11, wherein the function to be launched includes at least one of: triggering a self-recovery of the BMC, retrying communication based on the management interface, requesting a service of the processor, and obtaining a log of the BMC.

15. The apparatus according to claim 11, wherein the controller is further constructed and arranged to:
   in response to detecting the failure of the management interface, transmit a failure message to a message store, and
   enable the BMC to detect whether the failure message exists in the message store.

16. The apparatus according to claim 11, wherein the transmitting unit is further configured to:
   transmit a self-recovery request from the processor to the BMC via the control interface so as to trigger a self-recovery of the BMC.

17. A computer program product for backup communication, the computer program product comprising a non-transitory computer readable medium encoded with computer-executable code, the code configured for the execution of:
   detecting a failure of a management interface between a processor and a baseboard management controller (BMC), including determining whether a length of a time interval of communication of the management interface between the processor and the BMC exceeds a threshold length;
   in response to detecting the failure of the management interface, performing backup communication between the processor and the BMC using a control interface, the backup communication being a bi-directional communication, and the BMC being able to obtain a physical parameter of the processor via the control interface; and
   transmitting a packet between the processor and the BMC via the control interface, the packet in the backup communication including a communication type code, a function code and a response code, the communication type code indicating a type of the backup communication, the function code indicating a function to be launched, and the response code indicating a response state of the backup communication.

* * * * *